(12) United States Patent
Bertot et al.

(10) Patent No.: US 9,043,692 B2
(45) Date of Patent: May 26, 2015

(54) PREDICTIVE SYSTEM RECOMMENDED ACTIONS BASED ON RECENT ACTIVITIES

(75) Inventors: German Bertot, Foster City, CA (US); Jooturu Chinna Ramesh Kumar Reddy, Hyderabad (IN); Manish Srivastava, Cary, NC (US); Matthew Sherman, Pleasanton, CA (US); Shalaka Natu, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 147 days.

(21) Appl. No.: 13/236,764

(22) Filed: Sep. 20, 2011

(65) Prior Publication Data

US 2013/0073935 A1 Mar. 21, 2013

(51) Int. Cl.
*G06F 3/00* (2006.01)
*G06Q 10/04* (2012.01)
*G06Q 30/06* (2012.01)

(52) U.S. Cl.
CPC ............ *G06Q 10/04* (2013.01); *G06Q 30/0631* (2013.01)

(58) Field of Classification Search
CPC .......................... G06Q 10/04; G06Q 30/0631
USPC .......................... 715/205, 234, 243, 254, 255
See application file for complete search history.

(56) References Cited

U.S. PATENT DOCUMENTS

| | | | |
|---|---|---|---|
| 2004/0133583 A1* | 7/2004 | Tingey ........................... | 707/100 |
| 2006/0143034 A1* | 6/2006 | Rothermel et al. ............... | 705/1 |
| 2010/0185477 A1* | 7/2010 | Soga ................................ | 705/7 |
| 2011/0307856 A1* | 12/2011 | Klaka et al. .................... | 717/104 |
| 2012/0079409 A1* | 3/2012 | Luo et al. ....................... | 715/772 |
| 2013/0282405 A1* | 10/2013 | Van Zon et al. .................... | 705/3 |

* cited by examiner

*Primary Examiner* — Kyle Stork (74) *Attorney, Agent, or Firm* — Kilpatrick Townsend & Stockton LLP (57) ABSTRACT

Embodiments of the invention provide systems and methods for tracking recent activities of processes and presenting recommended next actions based thereon. According to one embodiment, a method of tracking and interacting with one or more processes can comprise detecting one or more activities, each activity related to at least one of a plurality of ongoing transactions of the one or more processes. The one or more activities can be recorded in records of an activity log. At a later point in time, relevant records of the activity log for a particular user can be identified. A determination of a recommended next action can be made for each identified relevant record based on the recorded activity and the related transaction. A list of the identified relevant records of the activity log and the determined recommended next actions can be generated and presented to the user.

14 Claims, 6 Drawing Sheets

Recent Activity — 510

* Activity Since 1/1/11

View ▼ Format ▼ | Freeze | Detach | Wrap

| Activity 610 | Negotiation 615 | Activity Date 620 | Recommended Action 625 |
|---|---|---|---|
| Negotiation pending award | 36855 | | Award negotiation |
| Negotiation pending award | 36914 | | Award negotiation |
| Pending collaboration team task | 35396 | | Complete task |
| Pending collaboration team task | 35396,1 | | Complete task |
| New team assignment | 36914 | 5/23/11 | View negotiation |
| New team assignment | 36913 | 5/23/11 | View negotiation |
| New responses | 36855 | 5/19/11 | View response history |
| New team assignment | 36855 | 5/19/11 | View negotiation |
| Award complete | 36320 | 5/4/11 | Create purchasing do |
| New responses | 36320 | 5/4/11 | View response history |
| New team assignment | 36320 | 5/4/11 | View negotiation |
| New responses | 35015-2 | 5/3/11 | View response history |
| Negotiation round published | 35015-2 | 5/3/11 | View negotiation |
| New team assignment | 35015-2 | 5/3/11 | View negotiation |

Columns Hidden 1

601 → (row 1)
602 → (Pending collaboration team task row)
603 → (New team assignment row)

US 9,043,692 B2

PREDICTIVE SYSTEM RECOMMENDED ACTIONS BASED ON RECENT ACTIVITIES

BACKGROUND OF THE INVENTION

Embodiments of the present invention relate generally to methods and systems for tracking and interacting with one or more processes and more particularly to tracking recent activities of the processes and presenting recommended next actions based thereon.

An application such as an enterprise application can allow users to track, interact with, and/or manage processes that can involve other parties and may run over an extended period of time. For example, in a procurement process, business users such as category managers are involved in many procurement transactions such as Requests for Quotes (RFQs), Requests for Information (RFIs), and auctions at any one time. Activities may occur on several of these transactions over the course of hours and/or days. For example, the category manager may get invited by another user to collaborate on an RFQ, suppliers may have recently placed bids on an auction he had published, a recent RFQ may have just become overdue for awarding, etc.

However, current applications for managing such processes do not provide an easy way for the user to keep track of and interact with these processes and especially more than one process at a time. For example, existing procurement applications do not provide systematic information on recent activities related to ongoing RFQs etc. for which a user is waiting. Furthermore, once an event related to such a process has occurred, e.g., a quote has been received, existing applications provide no guidance as to what action should be taken, nor do they enable taking that action easily. Rather, using an existing application, the user needs to query various screens in the application to determine what activities occurred for each transaction in which he is involved. The user then determines the next appropriate action for each activity. Then, the user navigates the application, e.g., through menus etc., to execute the next actions to progress the process. This approach is not only time consuming but prone to error as it relies heavily on the user to remember all of the processes of relevance to him and to identify and take appropriate action as needed. Hence, there is a need for improved methods and systems for tracking recent activities of the processes and presenting recommended next actions based thereon.

BRIEF SUMMARY OF THE INVENTION

Embodiments of the invention provide systems and methods for tracking recent activities of processes and presenting recommended next actions based thereon. According to one embodiment, a method of tracking and interacting with one or more processes can comprise detecting one or more activities, each activity related to at least one of a plurality of ongoing transactions of the one or more processes. For example, the one or more processes can comprise a procurement process of an enterprise application and the plurality of ongoing transactions can be a plurality of ongoing procurement negotiations.

The one or more activities can be recorded in records of an activity log. At a later point in time, for example upon a user accessing an application managing the transactions and/or requesting an update, relevant records of the activity log for that user can be identified. For example, each record of the activity log can comprise an indication of the transaction and an indication of the activity. Identifying relevant records can comprise identifying records related to transactions in which the user is a participant. In some cases, identifying relevant records can result in identifying records related to a plurality of transactions and a plurality of different processes.

A determination of a recommended next action can be made for each identified relevant record based on the recorded activity and the related transaction. Determining the recommended next action for each identified relevant record can be further based on a business process definition of the related transaction. A list of the identified relevant records of the activity log and the determined recommended next actions can be generated and presented to the user. For example, the list of the identified relevant records of the activity log and the determined recommended next actions can comprise a table. In such a case, each row of the table can include one of the identified relevant records and an indication of the determined recommended next action for that record. In some such cases, the indication of the determined recommended next action for each record can comprise a hyperlink for launching the recommended next action.

According to another embodiment, a system can comprise a processor and a memory communicatively coupled with and readable by the processor. The memory can have stored therein a sequence of instructions which, when executed by the processor, causes the processor to track and interact with one or more processes by detecting one or more activities, each activity related to at least one of a plurality of ongoing transactions of the one or more processes. For example, the one or more processes can comprise a procurement process of an enterprise application and the plurality of ongoing transactions can be a plurality of ongoing procurement negotiations.

The one or more activities can be recorded in records of an activity log. At a later time, relevant records of the activity log can be identified for a particular user. Additionally, one or more recommended next actions for each identified relevant record can be determined based on the recorded activity, the related transaction, and a business process definition of the related transaction. A list of the identified relevant records of the activity log and the determined recommended next actions can be generated and presented to the user. For example, the list of the identified relevant records of the activity log and the determined recommended next actions can comprise a table wherein each row of the table includes one of the identified relevant records and an indication of the determined recommended next action for that record such as a hyperlink for launching the recommended next action.

According to yet another embodiment, a computer-readable memory device can have stored thereon a sequence of instructions which, when executed by a processor, causes the processor to track and interact with one or more processes by detecting one or more activities, each activity related to at least one of a plurality of ongoing transactions of the one or more processes. The one or more processes can comprise a procurement process of an enterprise application and the plurality of ongoing transactions can comprise a plurality of ongoing procurement negotiations. The one or more activities can be recorded in records of an activity log and later identified as relevant records for a particular user. A recommended next action can also be determined for each identified relevant record based on the recorded activity, the related transaction, and a business process definition of the related transaction. A list of the identified relevant records of the activity log and the determined recommended next actions can be generated and presented to the user. For example, the list of the identified relevant records of the activity log and the determined recommended next actions can comprise a table, wherein each row of the table includes one of the identified relevant records and an indication of the determined recommended next action for that record such as a hyperlink for launching the recommended next action.

DETAILED DESCRIPTION OF THE INVENTION

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the invention provide systems and methods for tracking recent activities of processes and presenting recommended next actions based thereon. For example, upon login to system, the user can be automatically shown recent activities on transactions relevant for this user in a tabular format. Transactions shown can include transactions initiated by the user, as well as ones where he is collaborating with other users. For example, embodiments of the present invention may be implemented in an enterprise application in which a user may participate in any number of ongoing transaction or other processes. However, even though embodiments described herein are described in the context of such an enterprise application, it should be understood that embodiments of the present invention are not limited to use with such applications. Rather, embodiments of the present invention are thought to be equally applicable to any number of other types of applications in which a user desires to track numbers of different processes that are of relevance to that user. Such other implementations are also considered to be within the scope of the present invention.

Embodiments of the present invention provide for capturing activities and recording them in an activity log as they occur. Subsequently, upon login or request, embodiments provide for determining from the activity logs which recorded activities are relevant to this user, and displaying those activities. Embodiments also provide for predicting the most likely action the user would like to take against each activity, based on nature of the activity and definitions of business processes for different types of transactions maintained by the system. The determined action can be presented with the recorded activity, for example in a row of a table displayed to the user. According to one embodiment, the determined next action can be presented as a hyperlink in the table to execute the recommended action. In this way, embodiments of the present invention can help the user accomplish tasks faster since the user no longer has to query the system to figure our which activities occurred recently and, for the activities that have occurred, the user does not have to think about what to do next since the system recommends next actions. The user also does not have to navigate system menus and screens to execute the action since the system can provide a hyperlink to conveniently execute the determined actions. Various additional details of embodiments of the present invention will be described below with reference to the figures.

Figure 1:
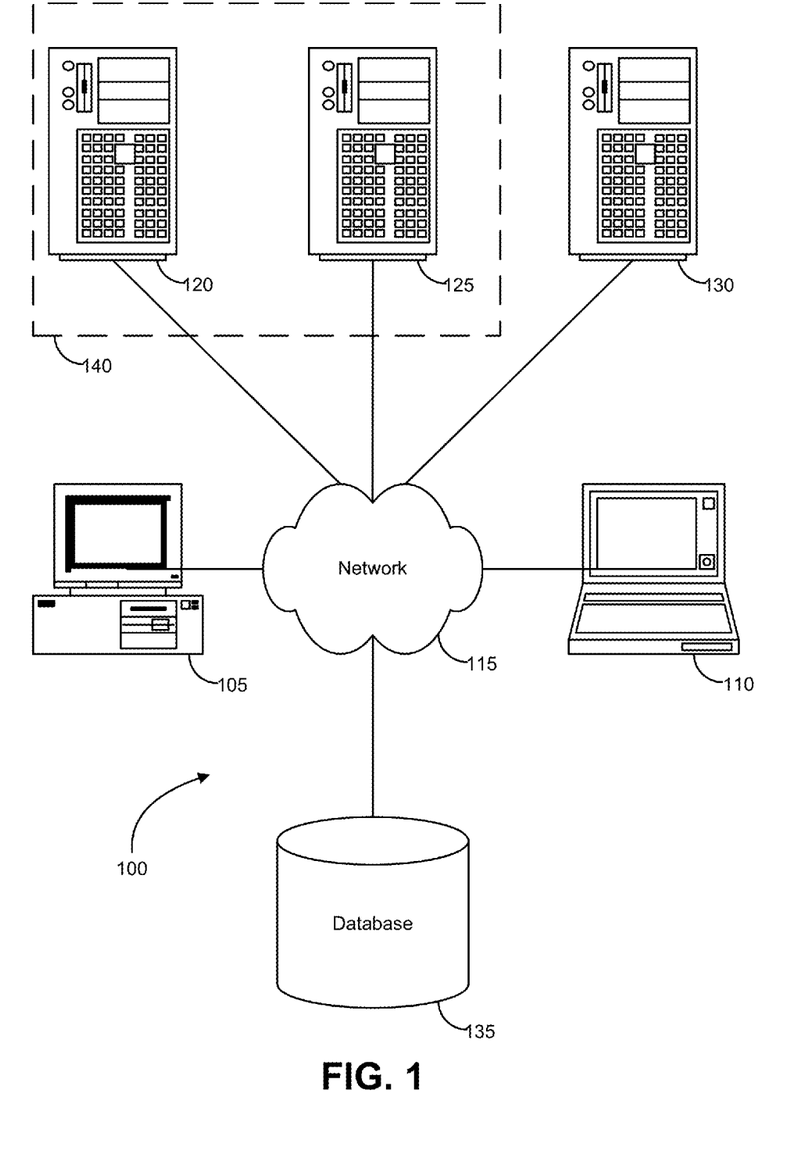
FIG. 1 is a block diagram illustrating components of an exemplary operating environment in which various embodiments of the present invention may be implemented.

FIG. 1 is a block diagram illustrating components of an exemplary operating environment in which various embodiments of the present invention may be implemented. The system 100 can include one or more user computers 105, 110, which may be used to operate a client, whether a dedicate application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may can be any type of network familiar to those skilled in the art that can support data communications using any of a variety of commercially-available protocols, including without limitation TCP/IP, SNA, IPX, AppleTalk, and the like. Merely by way of example, the network 115 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10g, that is adapted to store, update, and retrieve data in response to SQL-formatted commands.

Figure 2:
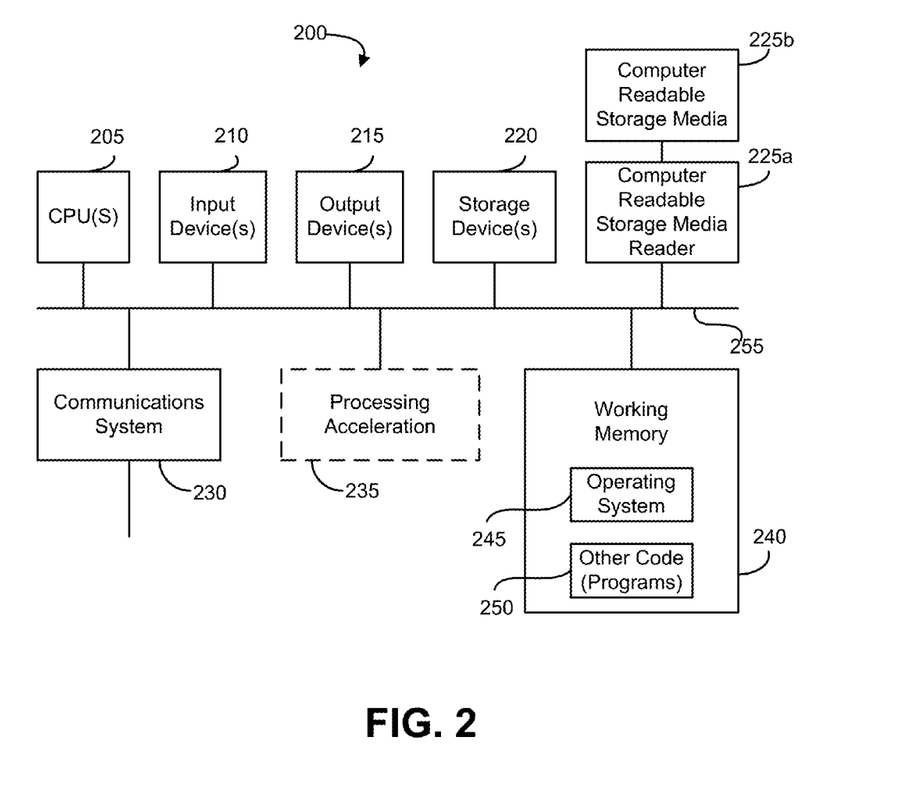
FIG. 2 is a block diagram illustrating an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

Figure 3:
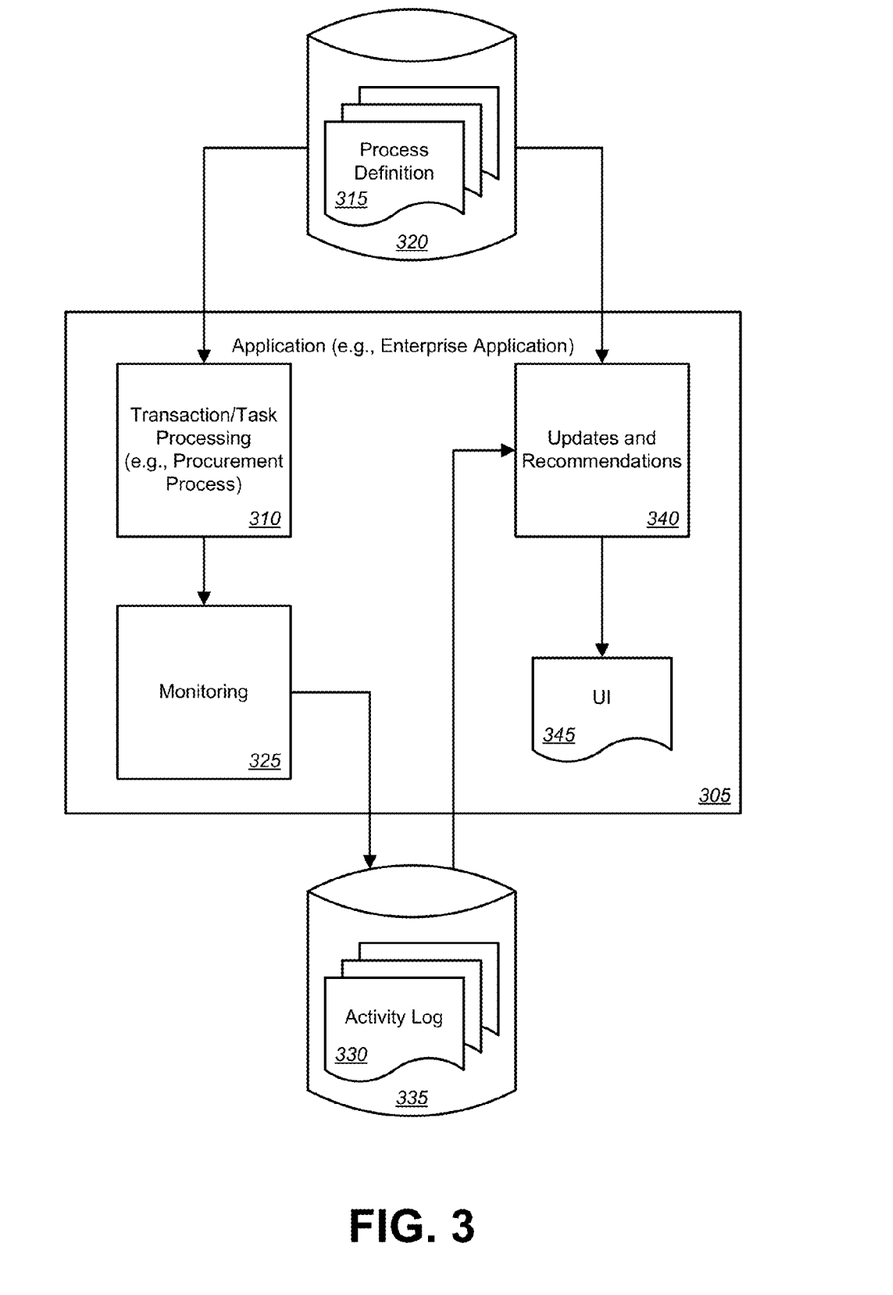
FIG. 3 is a block diagram illustrating, at a high-level, functional components of a system for tracking recent activities and presenting recommended next actions according to one embodiment of the present invention.

FIG. 3 is a block diagram illustrating, at a high-level, functional components of a system for tracking recent activities and presenting recommended next actions according to one embodiment of the present invention. In this example, the system includes an application 305, such as an enterprise application executing on a server or other computer system as described above. As noted above, embodiments of the present invention may be implemented in an enterprise application in which a user may participate in any number of ongoing transaction or other processes. However, even though embodiments described herein are described in the context of such an enterprise application, it should be understood that embodiments of the present invention are not limited to use with such applications. Rather, embodiments of the present invention are thought to be equally applicable to any number of other types of applications in which a user desires to track numbers of different processes that are of relevance to that user. Such other implementations are also considered to be within the scope of the present invention.

Regardless of the exact type, the application 305 can include a transaction or task processing module 310 that executes, tracks, and maintains any number of ongoing tasks or processes. For example, in an enterprise application, the transaction or task processing module 310 can execute and/or manage a number different transactions such as negotiations including Requests for Quotes (RFQs), Requests for Information (RFIs), and auctions at any one time. These processes may be defined in a set of process definitions 315 maintained by the application 305 in one or more repositories 320. For example, the process definitions 315 can comprise a set of Business Process Execution Language (BPEL) definitions or another set of rules and/or metadata defining the processes.

As introduced above, embodiments of the present invention provide for making a user of the application 305 aware of things that happen when the user is monitoring the system. So, as different events happen within the system related to ongoing transactions managed by transaction or task processing module 310, those events can be captured by monitoring module 325 and recorded in one or more activity logs 330 maintained in a repository 335. It should be understood that, while illustrated here as separate repositories 320 and 335 for the sake of simplicity, the repository 320 storing the process definitions 315 and the repository 335 storing the activity logs may be the same or different physical and/or logic repository. Additionally, it should be understood that the one or more activity logs 330 need not be considered a separate, defined log or collection of data but, depending upon the exact implementation, may comprise, for example, a number of records stored in various tables of a database or other data stored in one or more locations that can be queried and/or collected upon request.

Also as introduced above, embodiments of the present invention provide for presenting to the user of the application information of the events recorded in the activity logs 330 and, based on the events, determine and show what a next likely action may be. So for example, when a user logs in or accesses the application 305 or requests an update, the user can be presented with a summary of what happened to the transactions or processes and indications of recommended next actions for each process so that the user can easily follow up and continue as needed. In the context of enterprise application and geared toward procurement, a supplier elsewhere in the world in negotiation with a user that is a strategic buyer may, for example, make a quote on an RFQ issued by the buyer. When the buyer logs on or requests an update, an indication of the quote can be given along with a recommended next action such as review the quote, approve or reject the quote, etc.

Such updates and recommendations can be made by an updates and recommendations module 340 based on the activity logs 330 and process definitions 315. Updates can be made by the updates and recommendations module 340 based on a relevance of events stored in the activity logs 330 to the current user, i.e., the user logging on or requesting an update. The relevance of each event can be determined based on a team or group to which the user belongs, based on transactions to which the user is a responsible party, based on processes in which the user is defined as a participant, etc. Recommendations for each relevant event can be made by the updates and recommendations module 340 based on the process definitions 315 for the process in which each relevant event was detected. So for example, in the procurement process, the process definition 315 for that process may indicate that upon receipt of a quote the buyer should review and either accept or reject the quote.

Using the identified relevant events and corresponding determined next action for each, the updates and recommendations module 340 generates and provides a unified view, for example in a web page or other user interface 345. Examples of such interfaces are described below with reference to FIGS. 5 and 6. However generally speaking, such an interface 345 can include multiple transactions/processes determined to be relevant to the user and with the corresponding next action for each. According to one embodiment, this unified view can be presented in tabular form, for example, embedded in an overview page that includes a dashboard-like view of relevant processes. Such a table can include an entry or row for each event. For example, each row can include an identification of the transaction, the action that happened, when it happened, and a recommended action or next step. According to one embodiment, the recommended next action may be presented in the form of a hyperlink that, upon selection by the user, initiates a process of the application 305 for performing that action.

Stated another way, tracking and interacting with one or more processes can begin with the monitoring module 325 detecting one or more activities related to at least one of a plurality of ongoing transactions being handled by the transaction or task processing module 310 of the application 305. The one or more activities can be recorded by the monitoring module 325 in records of an activity log 330. When the user logs on or requests an update of the status of transactions or processes, the updates and recommendations module 340 module can read the activity logs 330 and identify records stored therein that are relevant to this user. For example, identifying relevant records can comprise identifying records related to transactions in which the user is a participant. Additionally or alternatively, records can be identified based on other considerations such as a user's role, group memberships, etc. In some cases, identifying relevant records can comprises identifying records related to two or more different transactions. Further still, the plurality of transactions can comprise transactions of two or more different processes. That is, the records of the activity logs 330 can span many different transactions, processes, and even different applications. Thus, the records identified as relevant by the updates and recommendations module 340 can comprise a collection of records across multiple different transactions and even multiple different processes in which the user is a participant, to which the user's role is relevant, to which the user's groups are related, etc. Activities that were at some point relevant may become no longer relevant because, for example, the user followed up on the recommended action etc. Therefore, according to one embodiment, records can be removed from the activity logs 330 once the recommended action for the record has been completed, after some expiration period or deadline, or after some other action or condition has made the activity obsolete.

For each identified relevant record, a determination of a recommended next action can be made by the updates and recommendations module 340. This determination can be made based on the recorded activity identified from the activity logs 330 and the business process definition 315 of the related transaction. A list can be generated by the updates and recommendations module 340 that includes the identified relevant records of the activity log 330 and the determined recommended next actions. For example, the list of the identified relevant records of the activity log 330 and the determined recommended next actions can comprise a table wherein each row of the table includes one of the identified relevant records, for example by identifying the activity and/or the related transaction, and an indication of the determined recommended next action for that record. Additionally, other information from the activity log 330, such as a time and/or date of the activity, responsible parties, etc., may be included. Such a table may be included in a web page or other interface 345 which can then be presented by the updates and recommendations module 340 to the user.

Figure 4:
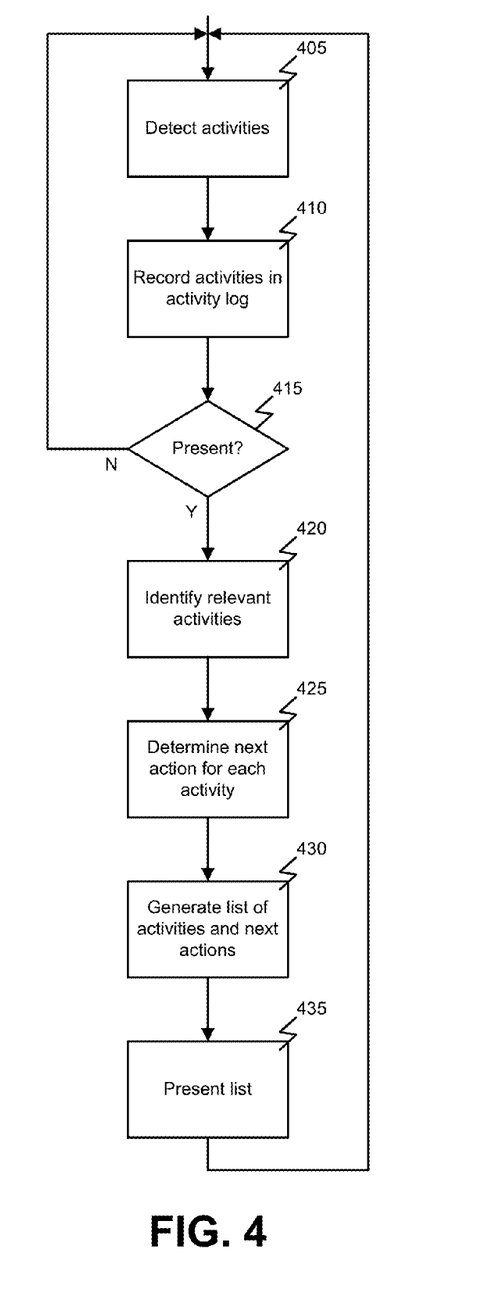
FIG. 4 is a flowchart illustrating a process for tracking recent activities and presenting recommended next actions according to one embodiment of the present invention.

FIG. 4 is a flowchart illustrating a process for tracking recent activities and presenting recommended next actions according to one embodiment of the present invention. In this example, tracking and interacting with one or more processes can begin with detecting 405 one or more activities related to at least one of a plurality of ongoing transactions of the one or more processes. For example, the one or more processes can comprise a procurement process of an enterprise application. In such cases, the plurality of ongoing transactions can comprise a plurality of ongoing procurement auctions, RFQs, RFPs, etc. The one or more activities can be recorded 410 in records of an activity log. According to one embodiment, each record of the activity log can comprise an indication of the transaction and an indication of the activity. In some cases, the record may also include information such as a time and/or date of the activity, a status of the activity and/or transaction, a responsible party for the activity, etc.

A determination 415 can be made as to whether update a user on the status of the process. For example, this determination 415 can be based on or made in response to the user logging into a system and accessing an application managing the one or more processes. Additionally or alternatively, this determination 415 can be based on or made in response to a request from the user for an update on a status of the one or more processes. In response to determining to not update the user, processing can continue with detecting 405 and recording 410 activities.

Once a determination 415 is made to update the user, relevant records of the activity log for the user can be identified 420. For example, identifying 420 relevant records can comprise identifying records related to transactions in which the user is a participant. Additionally or alternatively, records can be identified 420 based on other considerations such as a user's role, group memberships, etc. In some cases, identifying 420 relevant records can comprises identifying records related to two or more different transactions. Further still, the plurality of transactions can comprise transactions of two or more different processes. That is, the records identified 420 as relevant can comprise a collection of records across multiple different transactions and even multiple different processes in which the user is a participant, to which the user's role is relevant, to which the user's groups are related, etc.

For each identified relevant record, a determination 425 of a recommended next action can be made. This determination 425 can be made based on the recorded activity and the related transaction. For example, determining 425 the recommended next action for each identified relevant record can be based on a business process definition of the related transaction.

A list can be generated 430 that includes the identified relevant records of the activity log and the determined recommended next actions. For example, the list of the identified relevant records of the activity log and the determined recommended next actions can comprise a table wherein each row of the table includes one of the identified relevant records, for example by identifying the activity and/or the related transaction, and an indication of the determined recommended next action for that record. Additionally, other information from the activity log, such as a time and/or date of the activity, responsible parties, etc., may be included. Such a table may be included in a web page or other interface which can then be presented 435 to the user. Examples of such an interface are described in greater detail below with reference to FIGS. 5 and 6.

Figure 5:
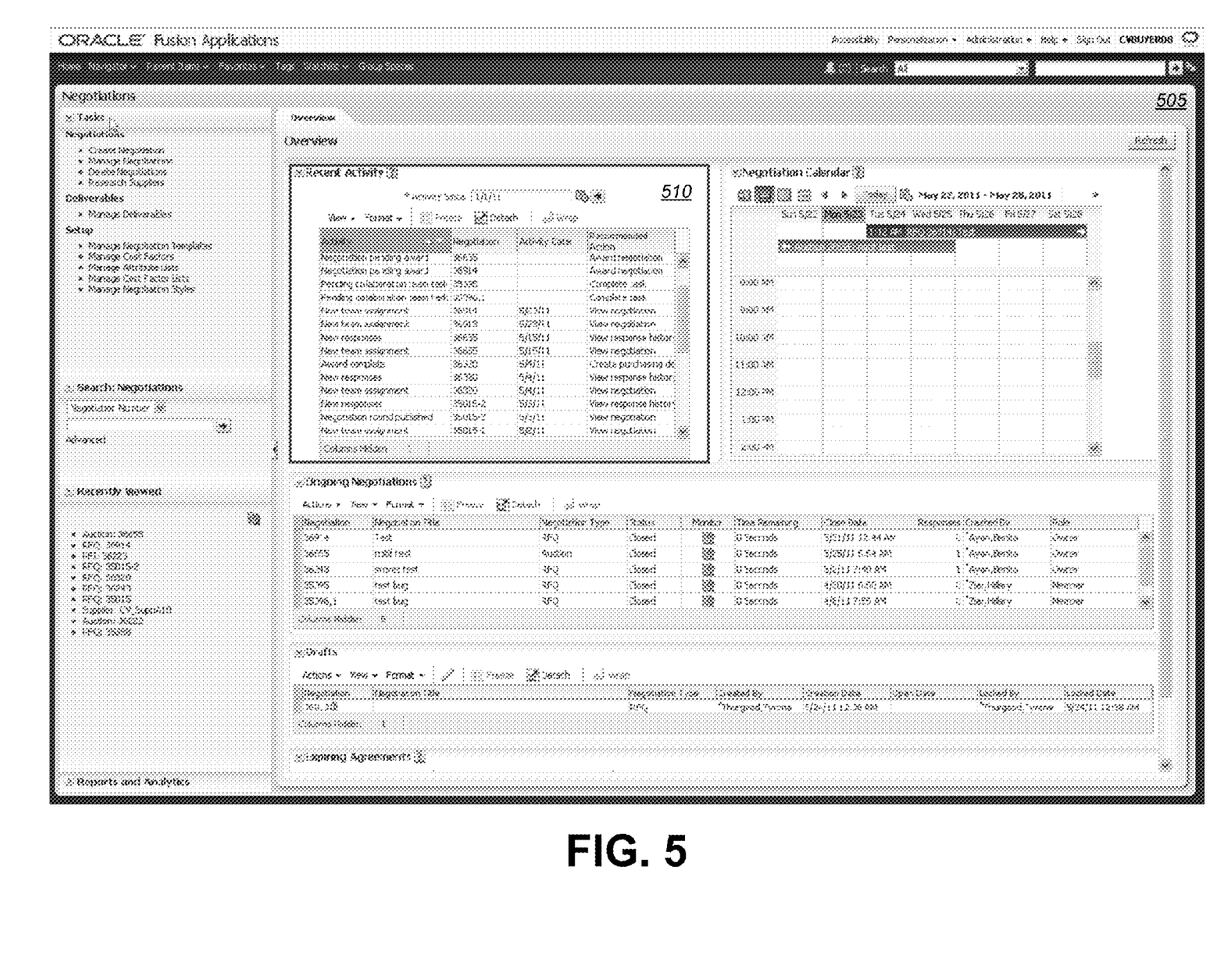
FIG. 5 is a screenshot illustrating an exemplary user interface for tracking recent activities and presenting recommended next actions according to one embodiment of the present invention.

FIG. 5 is a screenshot illustrating an exemplary user interface for tracking recent activities and presenting recommended next actions according to one embodiment of the present invention. As noted above, a user interface for tracking activities related to one or more ongoing transactions can be presented, for example, upon logon of a user to a system operating or executing an application for managing those transactions, such as a system executing an enterprise application. The example of FIG. 5 illustrates a homepage 505 of one such application. Also as described above, when the user logs onto the system, a list can be generated that includes the identified relevant records of the activity log and the determined recommended next actions. The list of the identified relevant records of the activity log and the determined recommended next actions can comprise a table 510 presented in the homepage 505 as shown here. Additional details of this table 510 are described below with reference to FIG. 6. However, it should be understood that the interfaces illustrated and described here are offered only by way of example and are not intended to limit the scope of the present invention. Rather, depending upon the exact implementation, the contents and format of the user interfaces can vary significantly without departing from the scope of the present invention. For example, rather than a table 510 embedded in or as part of a homepage 505 as shown here, the list of activities represented by the table 510 can be presented in this or another format as part of a dashboard, menu widget, separate page, pop-up window, etc. Other variations are contemplated and considered to be within the scope of the present invention.

Figure 6:
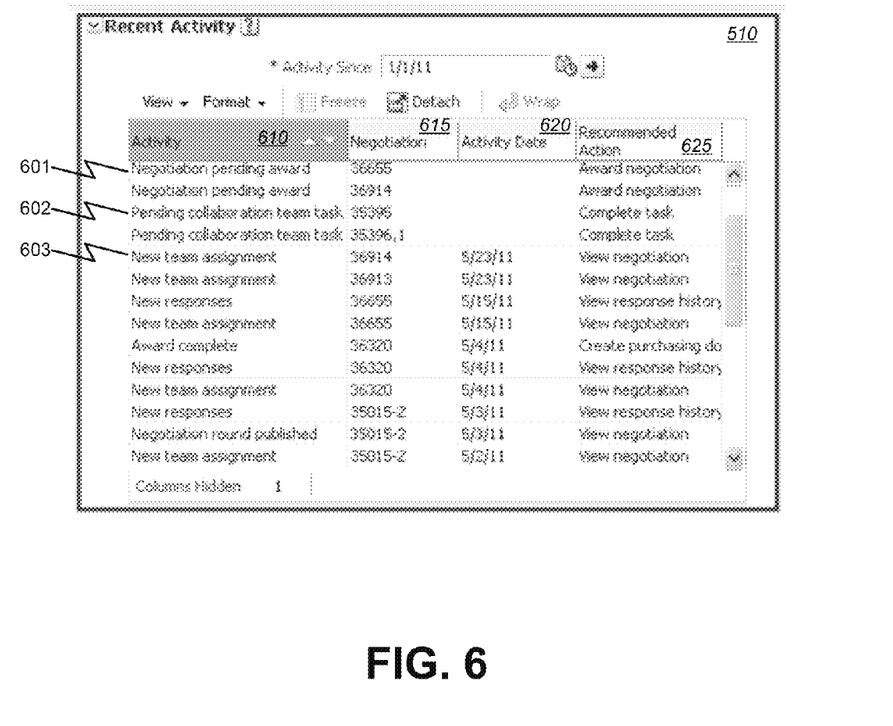
FIG. 6 is a screenshot illustrating additional details of the exemplary user interface for tracking recent activities and presenting recommended next actions according to one embodiment of the present invention.

FIG. 6 is a screenshot illustrating additional details of the exemplary user interface for tracking recent activities and presenting recommended next actions according to one embodiment of the present invention. More specifically, this example illustrates the table 510 as introduced above. As noted, this table 510 may be presented as part of homepage 505 or may be presented in a separate page, in a pop-up window etc., for example, in response to a user clicking a button, making a menu selection, etc. As shown here, each row 601, 602, 603 of the table 510 can include one of the identified relevant records. The table 510 can include columns identifying the activity 610 and/or the related transaction 615, a time and/or date 620 of the activity, and an indication 625 of the determined recommended next action for that record. According to one embodiment, the indication of the determined recommended next action for each record comprises a hyperlink for launching the recommended next action. Again, it should be understood that the interfaces illustrated and described here are offered only by way of example and are not intended to limit the scope of the present invention. Rather, depending upon the exact implementation, the contents and format of the user interfaces can vary significantly without departing from the scope of the present invention. For example, other information from the activity log, such as responsible parties, etc., may be included.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method of tracking and interacting with one or more processes, the method comprising:
    detecting by a computer system one or more activities, each activity related to at least one of a plurality of ongoing transactions of the one or more processes;
    recording by the computer system the one or more activities related to one or more of the plurality of ongoing transactions in records of an activity log;
    identifying by the computer system a plurality of relevant records of the activity log for a user of a plurality of users, wherein identifying the plurality of relevant records comprises identifying records related to a plurality of different, current, on-going transactions in which the user is a participant;
    determining by the computer system a recommended next action for the user for each identified plurality of relevant records based on the recorded one or more activities and a business process definition of the related one or more of the plurality of ongoing transactions;
    generating by the computer system a list of the identified the plurality of relevant records of the activity log and the determined recommended next actions, wherein the list of the identified plurality of relevant records of the activity log and the determined recommended next actions comprises a table, the table comprising one or more rows and a plurality of columns, and wherein each row of the table represents one of the identified relevant records for one of the different transactions, and the plurality of columns comprise at least one column including an identification of the transaction represented in each row, at least one column including an indication of an event that happened in the transaction represented in each row, at least one column including an indication of when the event that happened in the transaction represented in each row happened, and at least one column including an indication of the determined recommended next action for the transaction represented in each row; and
    presenting by the computer system in a homepage of an enterprise application managing at least one of the one or more processes a unified view comprising the table for the generated list of the plurality of relevant records and the determined next action to the user.

2. The method of claim 1, wherein the one or more processes comprise a procurement process of the enterprise application.

3. The method of claim 2, wherein the plurality of ongoing transactions comprises a plurality of ongoing procurement negotiations.

4. The method of claim 1, wherein each record of the activity log comprises an indication of the transaction and an indication of the activity.

5. The method of claim 1, wherein identifying the plurality of relevant records comprises identifying records related to a plurality of transactions.

6. The method of claim 5, wherein the plurality of transactions comprise transactions of a plurality of processes.

7. The method of claim 1, wherein the indication of the determined recommended next action for each record comprises a hyperlink for launching the recommended next action.

8. The method of claim 1, wherein identifying the plurality of relevant records of the activity log for the user, determining the recommended next action for each identified relevant record, generating the list of the plurality of identified relevant records of the activity log and the determined recommended next actions, and presenting the unified view to the user are performed in response to the user logging into a system and accessing the application managing the one or more processes.

9. The method of claim 8, wherein identifying the plurality of relevant records of the activity log for the user, determining the recommended next action for each identified relevant record, generating the list of the plurality of identified relevant records of the activity log and the determined recommended next actions, and presenting the unified view to the user are also performed in response to a request from the user for an update on a status of the one or more processes.

10. A system comprising:

a processor; and a memory communicatively coupled with and readable by the processor and having stored therein a sequence of instructions which, when executed by the processor, causes the processor to track and interact with one or more processes by:

detecting one or more activities, each activity related to at least one of a plurality of ongoing transactions of the one or more processes, record the one or more activities related to one or more of the plurality of ongoing transactions in records of an activity log, identifying a plurality of relevant records of the activity log for a user of a plurality of users, wherein identifying the plurality of relevant records comprises identifying records related to a plurality of different, current, on-going transactions in which the user is a participant, determining a recommended next action for the user for each identified plurality of relevant records based on the recorded one or more activities and a business process definition of the related one or more of the plurality of ongoing transactions, generating a list of the identified the plurality of relevant records of the activity log and the determined recommended next actions, wherein the list of the identified plurality of relevant records of the activity log and the determined recommended next actions comprises a table, the table comprising one or more rows and a plurality of columns, and wherein each row of the table represents one of the identified relevant records for one of the different transactions, and the plurality of columns comprise at least one column including an identification of the transaction represented in each row, at least one column including an indication of an event that happened in the transaction represented in each row, at least one column including an indication of when the event that happened in the transaction represented in each row happened, and at least one column including an indication of the determined recommended next action for the transaction represented in each row, and presenting in a homepage of an enterprise application managing at least one of the one or more processes a unified view comprising the table for the generated list of the plurality of relevant records and the determined next action to the user.

11. The system of claim 10, wherein the one or more processes comprise a procurement process of the enterprise application.

12. The system of claim 11, wherein the plurality of ongoing transactions comprises a plurality of ongoing procurement negotiations.

13. The system of claim 10, wherein the indication of the determined recommended next action for each record comprises a hyperlink for launching the recommended next action.

14. A computer-readable memory device having stored thereon a sequence of instructions which, when executed by a processor, causes the processor to track and interact with one or more processes by:

detecting by a computer system one or more activities, each activity related to at least one of a plurality of ongoing transactions of the one or more processes, wherein the one or more processes comprise a procurement process of an enterprise application and wherein the plurality of ongoing transactions comprises a plurality of ongoing procurement negotiations;

recording by the computer system the one or more activities related to one or more of the plurality of ongoing transactions in records of an activity log;

identifying by the computer system a plurality of relevant records of the activity log for a user of a plurality of users, wherein identifying the plurality of relevant records comprises identifying records related to a plurality of different, current, on-going transactions in which the user is a participant;

determining by the computer system a recommended next action for the user for each identified plurality of relevant records based on the recorded one or more activities and a business process definition of the related one or more of the plurality of ongoing transactions;

generating by the computer system a list of the identified the plurality of relevant records of the activity log and the determined recommended next actions, wherein the list of the identified plurality of relevant records of the activity log and the determined recommended next actions comprises a table, the table comprising one or more rows and a plurality of columns, and wherein each row of the table represents one of the identified relevant records for one of the different transactions, and the plurality of columns comprise at least one column including an identification of the transaction represented in each row, at least one column including an indication of an event that happened in the transaction represented in each row, at least one column including an indication of when the event that happened in the transaction represented in each row happened, and at least one column including an indication of the determined recommended next action for the transaction represented in each row; and presenting by the computer system in a homepage of an enterprise application managing at least one of the one or more processes a unified view comprising the table for the generated list of the plurality of relevant records and the determined next action to the user.

* * * * *

UNITED STATES PATENT AND TRADEMARK OFFICE
CERTIFICATE OF CORRECTION

| | | |
|---|---|---|
| PATENT NO. | : 9,043,692 B2 | Page 1 of 1 |
| APPLICATION NO. | : 13/236764 | |
| DATED | : May 26, 2015 | |
| INVENTOR(S) | : Bertot et al. | |

It is certified that error appears in the above-identified patent and that said Letters Patent is hereby corrected as shown below:

In the specification,
In column 4, line 62, after "figure" delete "our" and insert -- out --, therefor.

Signed and Sealed this
Ninth Day of February, 2016

Michelle K. Lee
*Director of the United States Patent and Trademark Office*